United States Patent [19]

Östlund

[11] Patent Number: 5,103,445
[45] Date of Patent: Apr. 7, 1992

[54] METHOD OF ADAPTING A MOBILE RADIO COMMUNICATION SYSTEM TO TRAFFIC AND PERFORMANCE REQUIREMENTS

[75] Inventor: Anders K. Östlund, Göteborg, Sweden

[73] Assignee: Telefonaktiebolaget L M Ericsson, Stockholm, Sweden

[21] Appl. No.: 560,784

[22] Filed: Jul. 31, 1990

[30] Foreign Application Priority Data

Aug. 25, 1989 [SE] Sweden ................................ 8902845

[51] Int. Cl.$^5$ ................................................ H04J 3/16
[52] U.S. Cl. ...................................... 370/79; 370/95.2; 340/825.08; 455/54.1
[58] Field of Search .................... 370/93, 95.1, 95.2, 370/95.3, 91, 82, 94.1, 85.8, 79; 455/33, 34, 54; 340/825.08

[56] References Cited

U.S. PATENT DOCUMENTS

| | | | |
|---|---|---|---|
| 4,398,289 | 8/1983 | Schoute | 370/93 |
| 4,573,207 | 2/1986 | Smith et al. | 455/54 |
| 4,672,608 | 6/1987 | Ball et al. | 370/93 |
| 4,736,371 | 4/1988 | Tejima et al. | 370/95.1 |
| 4,763,322 | 8/1988 | Eizenhöfer | 370/95.1 |
| 4,831,373 | 5/1989 | Hess | 455/33 |
| 4,866,788 | 9/1989 | Mouly et al. | 455/33 |
| 4,940,974 | 7/1990 | Sojka | 455/34 |
| 4,972,506 | 11/1990 | Uddenfeldt | 370/95.1 |

Primary Examiner—Benedict V. Safourek
Assistant Examiner—H. Kizou
Attorney, Agent, or Firm—Burns, Doane, Swecker & Mathis

[57] ABSTRACT

A method in a mobile radio communication system for adapting the system and communication to prevailing traffic and performance requirement. According to the invention a mobile station inserts information on particular codes in its messages transmitted to a base station in response to an invitation message from the base station. The codes indicate whether a message is new or retransmitted and/or message age. The base station receives radio signals in time slots identified in its invitation message and estimates for each time slot based on radio signals received in the time slot whether the time slot is empty or busy, or whether the time slot is empty or correct. For each message received and understood the base station retrieves the code. The retrieved codes and the number of empty/busy/correct slots enable the base station to estimate prevailing system traffic and performance. Estimations on prevailing traffic and performance are used to control system parameters such as number of time slots following an invitation message.

28 Claims, 6 Drawing Sheets

1

METHOD OF ADAPTING A MOBILE RADIO COMMUNICATION SYSTEM TO TRAFFIC AND PERFORMANCE REQUIREMENTS

TECHNICAL FIELD OF THE INVENTION

This invention relates to radio communication systems comprising base and mobile stations and at least one common radio channel for transmitting messages from mobile stations in time slots determined by a transmission invitation message from base station. In particular the invention relates to a method for adapting such a communication system to traffic and performance requirements by controlling system parameters.

BACKGROUND OF THE INVENTION

There are many access methods for radio communication systems where plural mobile stations share at least one common radio channel. According to one known method mobile stations do not transmit messages on the common radio channel until they have received a transmission invitation message authorizing them to transmit such messages. A base station ready for receiving certain kinds of messages from at least some mobile stations transmit a transmission invitation message comprising information on a number of time slots and slot length of transmission time slots on the common channel following the transmission invitation message. The transmission invitation message may also comprise information on which mobiles are authorized to transmit in succeeding time slots and what kind of messages and maximum length of messages that may be transmitted.

Any mobile station having a message to be transmitted on the common radio channel selects time slot for transmission after receiving an invitation message from the base station authorizing the mobile station to transmit the message. Plural mobile stations may be authorized simultaneously and each mobile station may select a time slot and a transmit its message independently of any other authorized mobile station. Accordingly, sometimes two or more mobile stations may transmit their messages in the same time slot whereby the base station may be unable to receive and understand any of the simultaneous messages. The base station transmits an acknowledgement message to any mobile station after receiving a message from that mobile station in a transmission time slot on the common radio channel according to an invitation message from the base station. The acknowledgement message is transmitted from the base station prior to transmitting a new transmission invitation message concerning the common radio channel.

Any authorized mobile station, having transmitted a message to the base station on the common radio channel but having not received an acknowledgement message from the base station prior to receiving a new transmission invitation message from the base station concerning the common radio channel, selects a new transmission time slot according to the new transmission invitation message and transmits a repetition of its message. The new transmission slot for the repetition is choosen among a group of random slots.

There may be various traffic and performance requirements on a radio communication system with base stations and plural mobile stations, in particular when the system is intended to cover a wide geographical area. Considering strong demands for radio frequencies and the increasing shortage of available frequencies, local, federal or governmental authorities granting use of frequencies may interested in efficient frequency use. A network operator responsive for base stations and their interconnections including exchanges and the overall system performance may be interested in a system which is profitable without excessive base station equipment and affords good service to subscribers. A network operator may be interested in a system using his equipment in an efficient way with easy to expand to suit a growing number of subscribers. A subscriber may be interested in a system offering high accessability and short response and mean waiting times. A subscriber may also be interested in reliable equipment to reasonable price and low subscription and communication rates.

Sometimes the interests of authorities, operators and subscribers are contradictory. The best way to meet operator requirements and compromises between authorities, operators and subscribers interests may change with time due to changing traffic load. Accordingly, it is important to be able to change at least some system parameters in order to optimize a radio communication system to traffic and performance requirements. In a system of the kind described above, there are several system parameters that can be changed, e.g. number of time slots after a particular invitation message, time slot length, the maximum length of a mobile station message, kinds or number of mobiles authorized to transmit after a particular invitation message, kinds of messages allowed to be transmitted after a particular invitation message and number of common channels. To be able to control system parameters in the right way, it is important to know traffic load and prevailing system performance with sufficient accuracy.

One method of adapting a communication system with base and mobile stations sharing a common channel is described in U.S. Pat. No. 4,398,289. According to this method, the base station classifies each time slot into one of three categories. A first category of time slots, called correct slots, are time slots in which the base station receives an understandable message from a mobile station. A second category of time slots, called empty slots, are time slots in which there apparently is no transmission of any message from any mobile station. A third category of time slots, called mutilated slots, are time slots where apparently at least one mobile station is transmitting a message but the base station cannot understand the message due to noise or interference from at least one other mobile station transmitting in the same time slot. The number of correct slots, the number of empty slots and the number of mutilated slots are counted for each invitation message. In the base station, the number of time slots of the next invitation message is adapted on the basis of the number of correct, empty and mutilated time slots of the previous invitation message and taking into consideration the conditional probabilities of the occurrence of correct empty and mutilated time slots, given the number of the mobile stations transmitting in a time slot. Another method of adapting a communication system with base and mobile stations sharing a common channel is described in U.S. Pat. No. 4,672,608. According to this method the system may operate in one of four modes, namely, light traffic mode, dynmic frame length mode, hybrid mode and polling mode. The invitation message from the base station comprises an operational code indicating the selected mode of operation. The value of the operational code and thereby the particular one of the modes is determined in response to an estimate of the prevailing traffic conditions.

Various parameters for adapting a radio communication system with base stations and plural mobile stations to traffic and performance requirements are available in a system called MOBITEX. In the available documentation on the MOBITEX, system control of several system parameters are suggested for the purpose of meeting various traffic loads and performance requirements, e.g. number of time slots, slot length, number of channels, maxim message length and selective authorization. There is, however no suggestion regarding how to estimate prevailing traffic load or prevailing system performance, e.g. access time or response time or mean waiting time.

SUMMARY OF INVENTION

Although some known methods when implemented in radio communication systems with base stations and plural radio stations sharing a common radio channel may be very useful and efficient for adapting the system to particular traffic conditions and performance requirements they may sometimes suffer from insufficient ability to estimate certain performance parameters. In view of different traffic conditions changing with time and different interests and priorities of operators and subscribers changing with time, it is important to be able to adapt the radio communication system not only for maximum capacity or throughput or minimum access or response time separately but also to certain combinations of performances parameters simultaneously, e.g. maximum capacity on condition that 95% or the subscribers have an access or response time not exceeding $\times$(milli)seconds.

One object of the present invention is to provide means and methods for estimating traffic conditions and prevailing performance parameters, in particular access or response conditions and times.

Another object of the present invention is to provide means and methods for adapting a radio communication system with base stations and plural mobile stations which share a common channel to traffic conditions and performance requirements.

According to one aspect of the present invention information on transmission codes are included in messages from mobile stations in response to invitation messages from base stations. The transmission codes are selected according to predetermined rules enabling a receiving base station receiving a mobile station message comprising such a transmission code to determine whether the received message was a new message transmitted by the mobile station for the first time or if the received message was a repetition message substantially repeating a previously transmitted new message for the first time or if the received message was a repetition message substantially repeating a previously transmitted new message for at least the second time.

According to another aspect of the present invention information on time codes are included in messages from mobile stations in response to invitation messages from base stations. The time codes are selected according to predetermined rules enabling a receiving base station receiving a mobile station message comprising such a time code to estimate message age.

According to a third aspect of the present invention, the base station receives radio signals appearing on the common radio channel in the transmission time slots of its invitation message and estimates, based on the received radio signals for each transmission time slot of the invitation message, whether the particular time slot is empty because there is no mobile station attempting to transmit or the particular time slot is busy because there is at least one mobile station attempting to transmit on the common radio channel at least part of a message in the time slot. The number of busy time slots of the invitation message, where according to the estimation at least one mobile station is attempting to transmit a message, is counted.

According to a fourth aspect of the present invention the base station receives radio signals appearing on the common radio channel in the transmission time slots of its invitation message and estimates, based on the received radio signals for each transmission time slot of the invitation message, whether the particular time slot is empty, because the base station has not received any understandable message from any mobile station attempting to transmit, or the particular time slot is correct, because there is an understandable message received by the base station from at least one mobile station correctly transmitting on the common radio channel at least part of message in the time slot. The number of correct time slots of the invitation message where, according to the estimation, at least one mobile station is correctly transmitting a message received and understood at the base station, is counted.

Transmitting transmission codes or time codes according to the present invention, in mobile station messages in response to base station invitation messages provides important tools for the estimation of traffic and performance parameters.

A base station receiving mobile station messages comprising transmission codes may easily estimate how often a mobile station receives an acknowledgement message without needing to send a repetition message, how often one repetition from a mobile station is required to receive an acknowledgement from its base station, and how often two or more repetition messages are required before a mobile station receives acknowledgement from its serving base station. A base station receiving mobile station messages comprising time codes may easily estimate how often an acknowledged mobile station message is older than or younger than a predetermined time. Minimum, maximum and average access attempts, response time or message delay may easily be estimated by using proper codes.

Subscriber requirements on accessability and delay time may impose restrictions on adaption of the system to an increasing traffic load from an increasing number of subscribers.

Used in combination with transmission or time codes, the counted number of busy time slots, where at least one mobile station attempts to transmit a message, constitutes an important tool particularly for estimating the traffic load.

As an alternative to using the number of busy slots the counted number of correct slots, in which messages are correctly (understandably) received, may constitute an important tool for the estimation of the traffic load when used in combination with transmission codes.

According to a preferred embodiment of the present invention, both transmission codes and time codes and the counted number of busy or correct time slots are used for adapting the system to traffic conditions and performance requirements.

In order to adapt a communication system in response to transmission and time codes of received messages and counted number of time slots, a plurality of system parameters may be controlled according to the present invention. The most important parameters are the number of random time slots of invitation message the time slot length the and maximum mobile station message length, number of channels or channel capacity, and changing authorization to transmit from time to time.

DESCRIPTION OF PREFERRED EMBODIMENTS

Embodiments of the invention will be described implemented in a particular mobile communication system of a type which in the relevant literature is often designated as "Slotted ALOHA". This particular system is capable of handling both packet data and speech communication and comprises some features not essential for the invention. Accordingly the invention is not restricted to this particular system but may be implemented in somewhat different systems.

Figure 1:
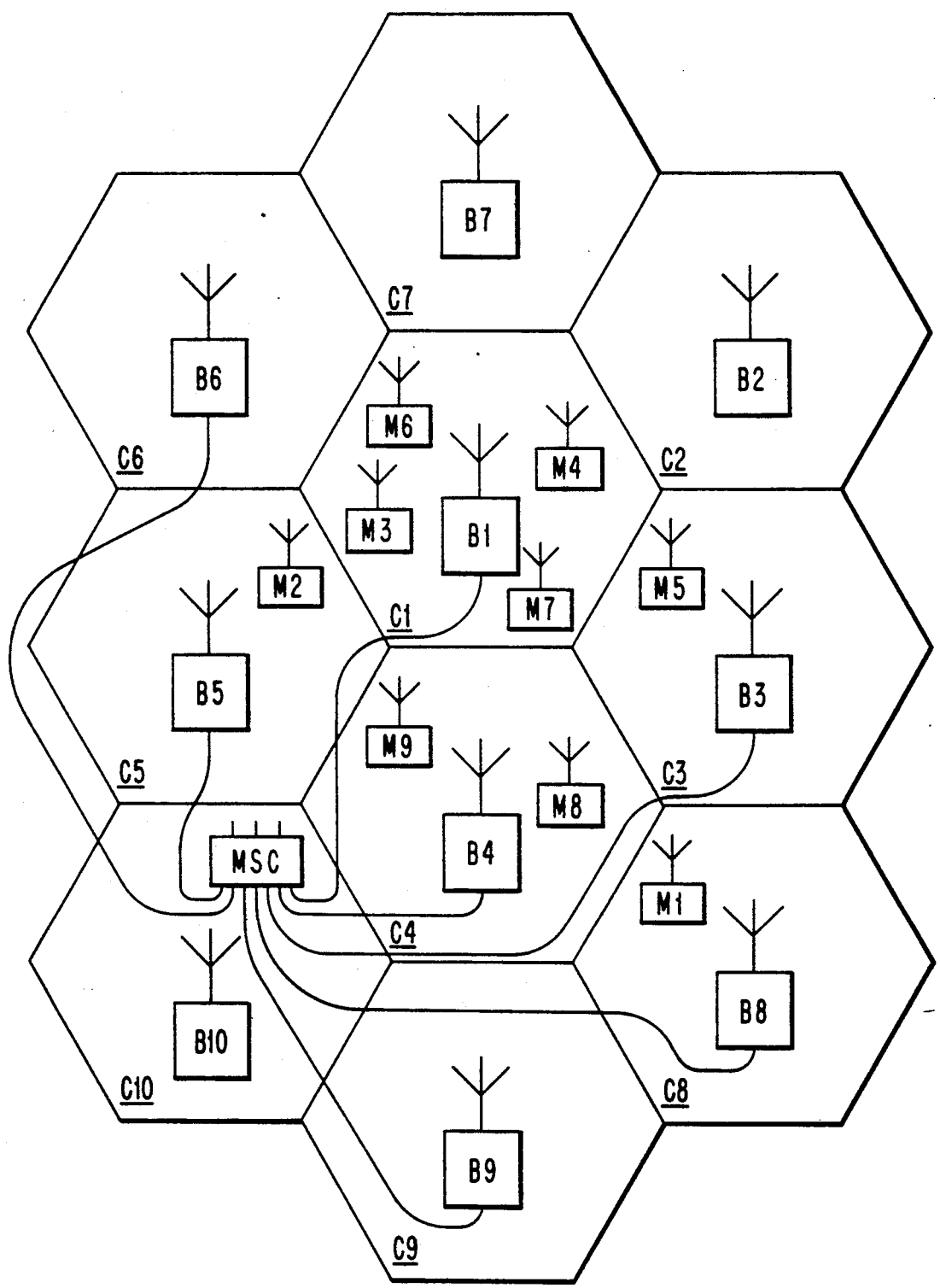
FIG. 1 illustrates a cellular mobile radio system

FIG. 1 illustrates ten cells C1 to C10 in a cellular mobile radio system. For each cell C1 to C10 there is a base station with the same number as the cell. FIG. 1 also illustrates ten mobile stations M1 to M10 movable within a cell and from one cell to another cell. The invention may be implemented in a cellular mobile radio system comprising more that ten base stations and ten mobile stations. In particular, the mobile stations are normally many times the number of base stations.

Also illustrated in FIG. 1 is a mobile switching center MSC connected to all ten illustrated base stations by cables. The mobile switching center may be connected by cables also to a fixed public switching telephone network or similar fixed private network. All cables from the switching center are not illustrated. The mobile system illustrated in FIG. 1 comprises at least one duplex radio channel and preferably a plurality of duplex radio channels for communication. Although some advantages may be achieved when two or more base stations share a radio channel according to the prevailing traffic load it will first be assumed, for the purpose of making the system and invention easier to understand, that each base station has its own duplex radio channel (pair of simplex radio channels) or its own allotted time on a duplex radio channel (pair of simplex radio channels) for communication with mobile stations served by that base station.

Although two ore more base stations may cooperate in certain procedures, e.g. handoff or roaming, it will for the purpose of explaining this invention be sufficient to consider only the communication between one base station, e.g. B1, and mobile stations served by this base station, e.g. M3, M4, M6 and M7.

Figure 7:
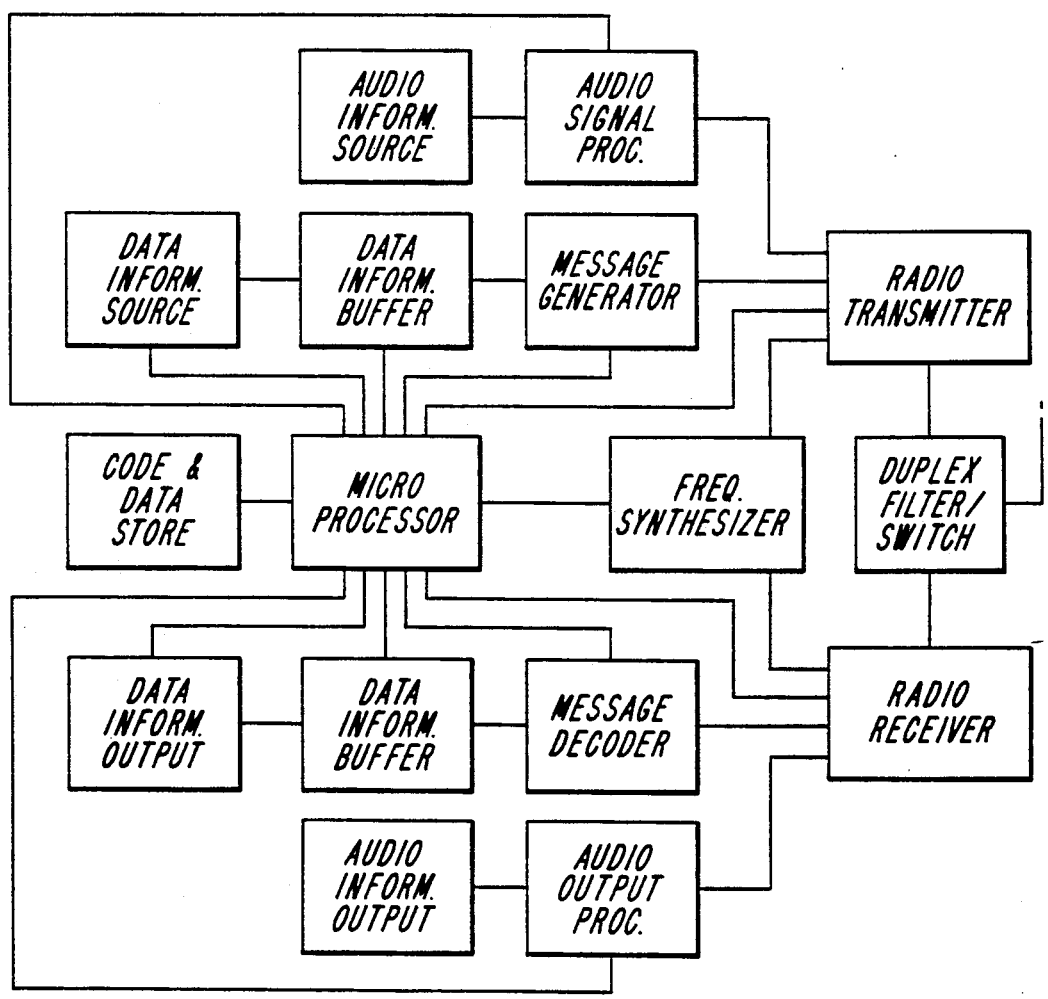
FIG. 7 and 8 illustrates simplified functional block diagrams of mobile and base stations possible to use when implementing the invention.
Figure 8:
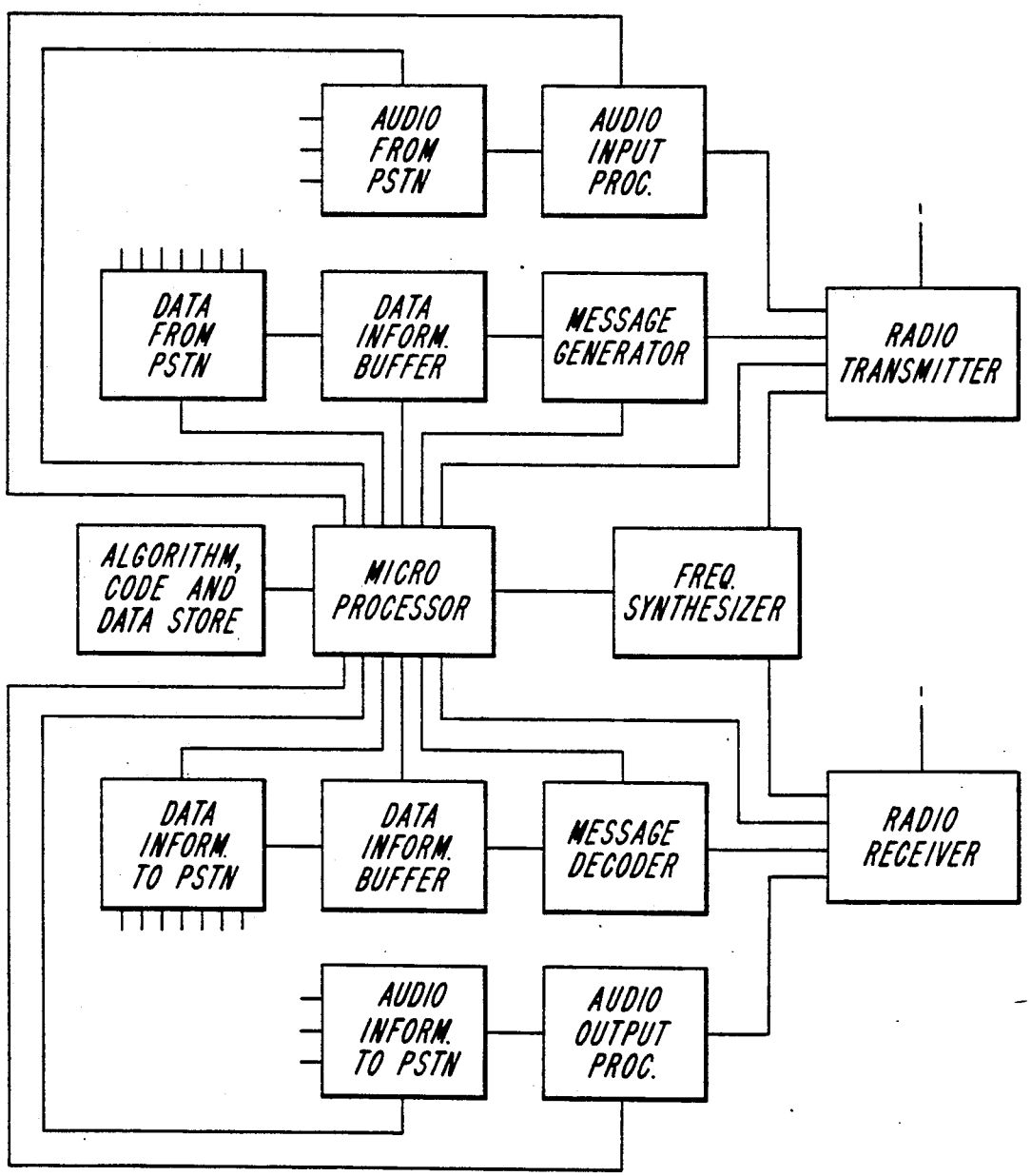

FIG. 7 illustrates a block diagram of a mobile station and FIG. 8 illustrates a block diagram of a base station which can be used in connection with a method according to the present invention. The base and mobile stations are designed for either full duplex audio communication, e.g. a normal telephone call, on a dedicated duplex radio channel (two simplex channels), or digital message communication in time slots of a radio channel that may be shared by plural mobile stations. Although a base station normally comprises means enabling it to simultaneous communication on more than one radio channel, only means for communication on one radio channel is illustrated in FIG. 8.

Both base and mobile station are comprised of a micro processor controlled radio transmitter and a microprocessor controlled radio receiver. The radio transmitter transmits radio signals modulated with either audio signals from an audio signal processor or digital messages generated by a message generator. In the mobile, the audio signal processor is connected to an audio information source, e.g. a microphone, while the message generator is connected to a data information source, e.g. a keyboard, via a data information buffer. In the base station the audio signal processor is instead connected to an audio line terminal receiving audio information from a PSTN to which the audio terminal is connected by fixed telephone lines, while the message generator via a data information buffer is connected to a data line terminal receiving data from a PSTN to which the data terminal is connected by fixed telephone lines. The radio receiver is connected to a message decoder for detecting messages understandably received and to an audio output processor. In the mobile the message decoder is connected to a data information output means, e.g. a display, via a data information buffer, while the audio output processor is connected to an audio information output means, e.g. a loudspeaker. In the base station the message decoder is instead connected via a data information buffer to a data line terminal supplying data to a PSTN to which the data terminal is connected by fixed telephone lines, while the audio output processor is connected to an audio line terminal supplying audio information to a PSTN to which the audio terminal is connected by fixed telephone lines. The radio channel on which the radio transmitters and receivers operate is determined by frequencies supplied from a frequency synthesizer controlled by the microprocessor. Finally the base station and mobile stations contain means for storing algorithms, codes, rules, formats and data.

Figure 2:
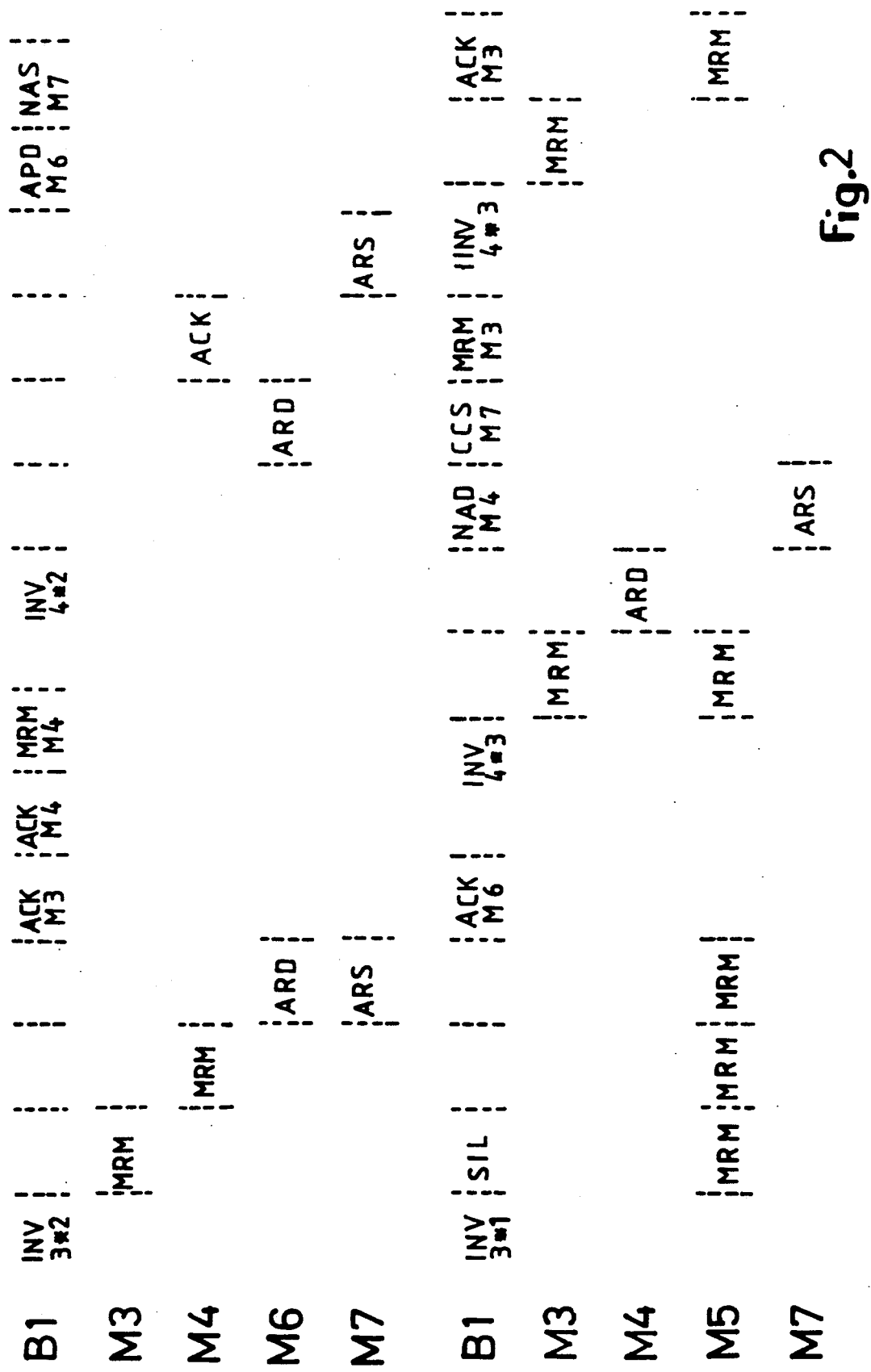
FIG. 2 and 3 illustrates transmission of invitation messages from a base station and other messages from served base stations in cellular mobile radio system according to FIG. 1.

Various examples of communication are illustrated in FIG. 2. The base station transmits a transmission invitation message, INV, when it is ready to handle traffic from served base stations. An invitation message precedes a communication cycle and authorizes all or at least some of the mobile stations to transmit at least some kind of messages on the radio channel during the communication cycle. The time available for transmission from mobile stations is divided in time slots. Some of the slots are designated random slots.

The invitation message comprises information on the following system parameters: total number of transmission slots following the invitation message, number of slots which are random slots, slot length of each individual slot, the maximum length of message permitted to be transmitted by mobile station in the time slots, which mobiles are authorized to transmit and what kind of messages may be transmitted by mobile station. In FIG. 2, the first of two digits indicated below a IVV message and separated by a * is the total number of slots. The second of the two digits is the number of random slots. The information in the transmission invitation message as well as in all other messages from base stations and mobile stations is encoded in an error protective coding.

A mobile station desirous of communication with/via the base station for a particular kind of traffic and authorized to transmit may act in different ways after receiving the transmission invitation message depending upon what particular kind of traffic is permitted by the invitation message. Speech normally requiring a full duplex channel is normally not permitted to be transmitted. A mobile station desirous of speech communication and authorized to transmit by an invitation message may instead transmit an access request for speech, ARS.

Depending on the prevailing traffic load in relation to the traffic handling capacity a mobile station authorized by an invitation message may not be permitted to immediately transmit data messages MRM longer than one or a few transmission time slots. A mobile station desirous of transmitting a data message longer than the maximum mobile station message length permitted by the invitation message may then instead transmit an access request for data, ARD.

Any authorized mobile station may normally transmit status messages and data messages and other messages MRM not exceeding one transmission time slot.

Any authorized mobile station desirous of communication with/via the base station selects one of the transmission slots according to the received invitation message. The selection of time slot depends on the time when the need for communication is initiated in relation to the time of receiving the transmission invitation message. When the mobile station desires to transmit access requests or other messages sufficiently short to be permitted and initiated prior to the mobile station receiving the transmission invitation message, the mobile station randomly selects one of the random slots and transmission begins at the start of the selected random slot. Depending on the message length in relation to slot length, the transmission may continue in part of one or in one or more whole succeeding time slots. Normally not more than one time slot is required for an access request and certain status messages.

When the mobile station desires to transmit access requests or other messages sufficiently short to be permitted and initiated after the mobile has received the transmission invitation message but sufficiently in advance of the end of the communication cycle the mobile station selects the next time slot and transmission begins at the start of the selected time slot.

After properly receiving a message from a mobile station in a transmission time slot according to an invitation message from the base station, the base station transmits an acknowledgement message to that mobile station prior to transmitting a new transmission invitation message concerning the common radio channel. If the base station has received understandable messages from two or more mobile stations in separate time slots, the base station transmits an acknowledgement message to each of the mobile stations. Preferably an acknowledgement message is transmitted as soon as possible after the end of the time slot comprising the end of the message to be acknowledged. Sometimes an acknowledgement message from the base station is not transmitted until after another message or after the last of the time slots according to an invitation message.

Depending upon the mobile station message to be acknowledged and the traffic conditions, the base station may transmit one of several different acknowledgement messages. One acknowledgement message, ACK, is transmitted simply to acknowledge a correctly received message from mobile station. In FIG. 2, the intended receiving mobile station is indicated below the acknowledgement message.

Access permission data, APD, is transmitted to acknowledge a correctly received message access request data, ARD, and to grant permission to transmit data. When such permission is granted the mobile station is expected to transmit a message, MRM, comprising a data packet.

Access permission speech, APS, is transmitted to acknowledge a correctly received message access request speech, ARS, and to grant permission to transmit a longer request message. When such permission is granted the mobile station is expected to transmit a message, MRM, comprising a request for a channel for speech and including identity of called subscriber.

No access permission speech, NAS, is transmitted to acknowledge a correctly received message access request speech, ARS, when for some reason no speech connection can be set up, e.g. when no radio channel for speech is available.

Change channel data, CCD, is transmitted by base station to make a mobile station tune to an other radio channel in order to transmit or receive a data message, MRM. The mobile station usually returns to the original channel when the data message has been transmitted or received.

Change channel speech, CCS, is transmitted by base station to made a mobile station tune to an other radio channel in order to transmit or receive a message, MRM, comprising a request for line connection for speech. Normally the mobile station returns to the original channel when the speech is terminated.

Sometimes two or more mobile stations select the same transmission time slot and each attempts to transmit at least part of a message in the same time slot. Then their radio signals will interfere at the base station. Depending on the relative strengths of the radio signals received at the base station from such two or more mobile stations none or possibly only one of the interfering messages will be understandable at the base station. The base station will then transmit an acknowledgement message only to the mobile station from which the base station received an understandable message, if any.

A message transmitted by a mobile station may also be received not understandable due to error when transmitting at mobile station or due to too low signal strength at base station or due to more noise or interferences than the error protective coding can cope with.

In FIG. 2 mobile station M6 transmits an ARD message in the same time slot as mobile station M7 transmits an ARS message. Due to interference none of the ARD and ARS messages are received understandable by base station B1 and accordingly none of these messages are acknowledged by base station B!. The same applies to the MRM messages transmitted by mobile stations M3 and M5 in the same time slot according to FIG. 2 and the three messages MRM, MRM and ARD transmitted in the same time slot by mobile stations M4, M6 and M7 respectively in FIG. 3.

When a mobile station has transmitted an access request or an other message of a kind that should be acknowledged by base station but the mobile station does not receive any acknowledgement message from the base station prior to receiving another transmission invitation message, the mobile station normally repeats its message not acknowledged. The repetition of the message is considered intitiated no later than the time of transmission of the original message. The repetition message is thus considered inititiated prior to receiving the transmission invitation message. Accordingly the mobile station selects at random one of the random time slots of the latest received transmission invitation message and starts transmission of the repetition message at the beginning of the selected random time slot.

In FIG. 2 is illustrated how mobile stations M6 and M7 transmits in separate time slots repetition messages ARD and ARS, respectively, due to prior simultaneous transmission of ARD and ARS messages not acknowledged by base station.

Figure 3:
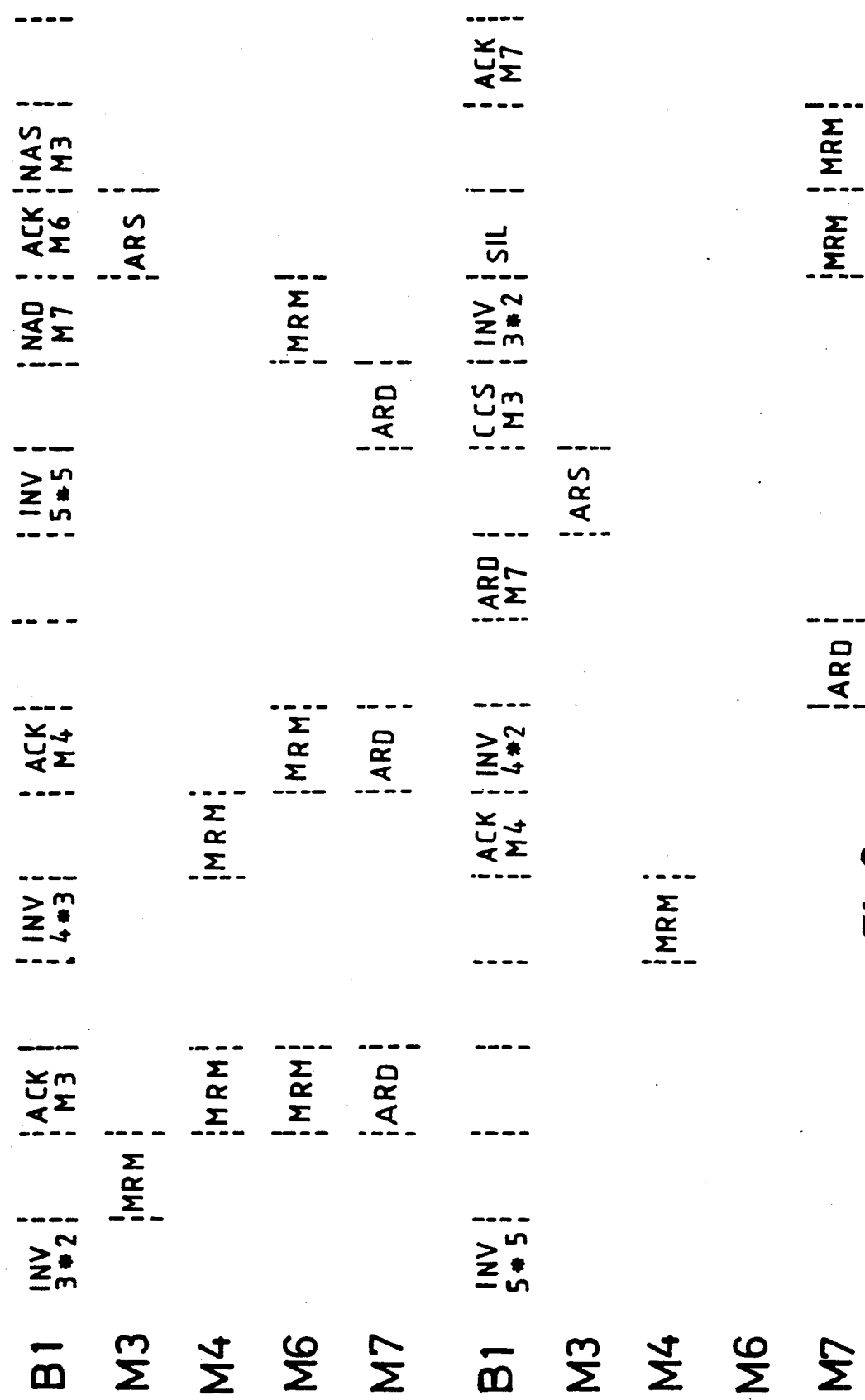

In FIG. 3 is illustrated how mobile stations M6 and M7 have to transmit repetition messages twice due to prior transmission of messages MRM and ARD twice in the same time slots, none of which prior messages was understandably received by base station B1 due to mutual interference and therefore not acknowledged by B1.

An access request or status message or a new message sufficiently short to be permitted to be transmitted without prior access request and a corresponding repetition message comprises information on a transmission code or a time code or both codes.

The transmission codes are selected according to determined rules enabling a receiving base station receiving a message comprising such a code to determine whether the received message was a message transmitted by the mobile station for the first time, or if the received message was a repetition message constituting a first repetition of a previously transmitted message, or if the received message was a repetition message constituting a second or subsequent repetition of a previously transmitted message. One of the simplest embodiments of transmission codes is a number indicating the number of times a message has been transmitted, e.g. the number 2 for a repetition message constituting the first repetition of a message previously transmitted only once. Another simple embodiment of transmission codes is a number indicating the number of times a message has been repeated, e.g. the number 0 for a message not yet repeated.

The time codes are selected according to predetermined rules enabling a receiving base station receiving a message comprising such a code to estimate message age. The message age may be defined to begin at various times, e.g. the time of initiation of the message or the time of generation or transmission of the message for the first time. One simple embodiment of time codes is to include in the message the absolute time of first generation or transmission of the message, e.g. hour, minute, second and fraction of second. Another simple embodiment of time codes is to include in the message the time difference between the first transmission of the message and the present latest transmission of a corresponding repetition message. From a subscribers point of view one interesting embodiment of time codes would be elapsed time after subscribers initiation of message, e.g. push of transmit button after dialing number of another subscriber.

Transmission codes of received mobile station messages are important performance parameters in particular for estimating traffic load in relation to channel capacity. An increase in the average of repetitions required from one transmission cycle to the succeeding transmission cycles indicates that the traffic load may tend to exceed traffic capacity with prevailing system parameters. Transmission codes of received messages are particularly useful in combination with the counted numbers of busy time slots where at least one mobile station is attempting to transmit or in combination with counted numbers of correct time slots in which messages are correctly received.

Time codes of received mobile station messages are important performance parameters in particular for estimation of times such as access or response or delay times but may also be useful for estimation of traffic load when used in combination with other performance such as transmission codes and the counted number of times slots where at least one mobile station is attempting to transmit.

Transmission and time codes and the counted number of time slots may be used not only for controlling communication cycle parameters such as number of slots and slot length but also to determine when the traffic load requires the opening up of another duplex radio channel or admits the closing down of a previously opened up additional radio channel. The additional channel may be used for data or speech communication and traffic may be diverted to or from a channel by messages such as change channel data, CCD, or change channel speech, CCS, or other messages. On the opened up additional duplex channel transmission invitation messages may be transmitted which authorize other mobile stations to transmit instead of those mobile stations authorized to transmit on the original radio channel by transmission invitation messages on that channel.

Many algorithms based on codes and counted number of time slots may be used for controlling system parameters according to the invention. Two simple algorithms for short time incremental control of the number of random time slots in future invitation messages will now be described.

Figure 4:
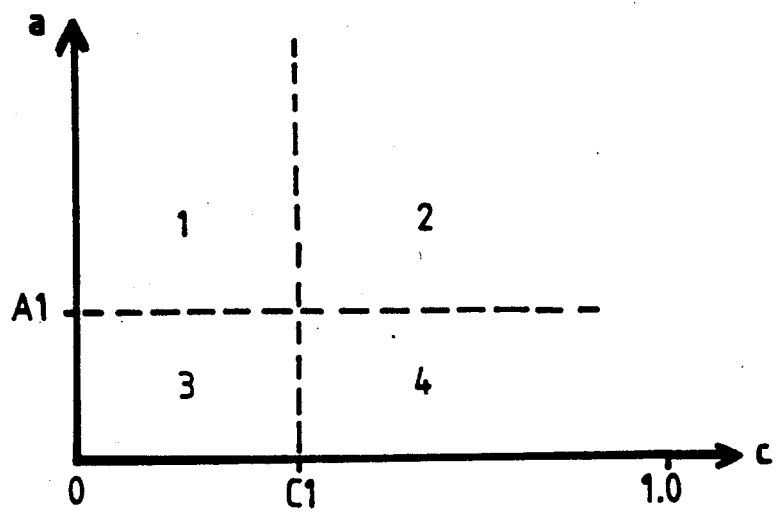
FIG. 4, 5 and 6 illustrates traffic conditions and control of number of slots according to a first, second and third embodiment of the invention, respectively.

The first algorithm uses the average of digital transmission codes of messages correctly received at base station in one transmission cycle, denoted "a" in FIG. 4, as one input. A second input of the first algorithm is the counted number of correct random slots divided by the number of random slots in one transmission cycle, denoted "c" in FIG. 4.

The first algorithm also uses a first code threshold, A1, for values of code average. The threshold A1 is choosen in order to separate traffic situations and system performance where retransmission from mobile stations is less frequent from traffic situations and system performance where retransmission of messages from mobile stations are more frequent.

The first algorithm also uses a first counted number threshold C1 for values of the counted number of correct random time slots divided by the number of random time slots in one transmission cycle. The threshold C1 is choosen in order to separate traffic situations and system performance where there are comparatively few correct random time slots in relation to the number of random time slots from traffic situations where there are comparatively many correct time slots in relation to the number of random time slots. Using the two inputs and the two thresholds four different areas of traffic and performance situations may be identified in the graph of FIG. 4. In the upper left area denoted 1, there are few correct slots but many retransmissions. When the system is in this area, the number of random slots should be increased by one in the next or future invitation messages.

In the upper right area denoted 2, there are many correct slots but also many retransmissions. The reception of radio signals may be bad, possibly due to noise. When the system is in this area the number of random slots should not be changed.

In the lower left area denoted 3, there are few correct slots and also few transmissions. The channel is probably underloaded and the number slots in the next transmission invitation message may be reduced with one.

In the lower right area denoted 4 there are many correct slots and few retransmissions. The channel is used efficiently and the number of random slots of next invitation should not be changed.

Instead of evaluating one transmission cycle at a time, two or more transmission cycles may be evaluated at a time, for controlling the next cycle. Then, the inputs "average transmission code" and "correct slots" are calculated commonly for the two or more latest cycles based on the total number of random slots of these cycles.

The second algorithm also uses two inputs one of which is the sum of digital codes of received messages divided by the number of random slots in one or more transmission cycles. The second algorithm also uses one threshold A2 for the correct random slots choosen in a way corresponding to the threshold A1 but not necessarily being exactly equal to A1.

The second algorithm also uses a second input, b, constituting the counted number of busy random time slots divided by the number of random slots in one or more transmission cycles. Unlike the first algorithm the second algorithm uses two thresholds, B1 and B2, for the counted number of busy random slots divided by the number of random slots. One of the thresholds, B1, is choosen to separate traffic conditions and system performance where the busy slots are few from traffic conditions and system performance where the busy slots are at a medium range. The other of the thresholds, B2, is choosen to separate traffic conditions and system performance where the busy slots are at a medium rage from traffic conditions and system performance where there are very many busy slots.

Figure 5:
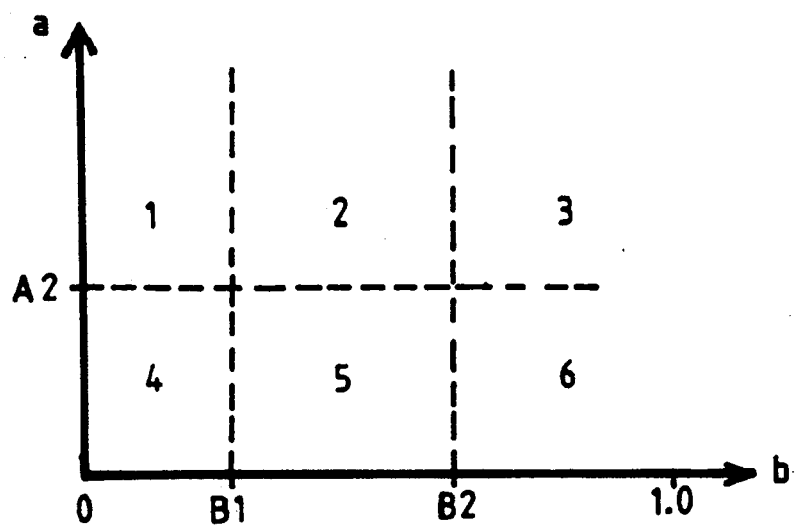

Using the two inputs and the three thresholds of the second algorithm, six areas of traffic and system operation may be identified in the graph of FIG. 5.

In an upper left area denoted 1 there is comparatively low slot usage but many retransmissions. The reception of radio signals is probably bad. No change of number of random slots should be done when the system is in this area.

In an upper middle area denoted 2 there is medium slot usage but many retransmissions. When the system is in this area the number of random slots should be increased by one.

In the upper right area denoted 3, there is high slot usage and many retransmissions. The channel is severely overloaded and the number of random slots of next transmission invitation message and communication cycle should be increased by two.

In the lower left area denoted 4, there are few retransmissions an few busy slots. The channel is underloaded and the number of random slots of next transmission invitation message may be decreased with one.

In the lower middle area denoted 5 there are few retransmissions but many busy time slots. The channel is at optimum or at least well loaded and the number of random slots should not be changed. In the lower right area denoted 6 there are few retransmissions but very many busy slots. The number of random slots may be increased with one.

The traffic handling capacity of a radio channel can of course not be increased infinitely by increasing the total number of time slots or the number of random slots of a transmission cycle. Furthermore, many time slots implies very long transmission cycles and delay of transmission of messages due at mobile station. Accordingly, increasing the total number of time slots or the number of random time slots over a certain amount hardly increases the traffic handling capacity and may cause more harm than positive effects. If it is possible to open up another radio channel, this is often a better alternative than increasing the number of time slots when the time slot number has already reached a certain number. Instead of increasing the number of time slots of the present radio channel the base station then opens up a new radio channel by transmitting on the present radio channel a message ordering certain mobile stations or categories or groups of mobile stations to retune to the new opened radio channel. On the new radio channel, the base station transmits invitation messages authorizing only certain mobiles to transmit messages on this new channel. On the previous channel, the base station transmits invitation messages authorizing only the other mobiles to transmit on the radio channel, previously used. Due to the load sharing between the channels the base station normally also immediately reduces the number of time slots on the previously used radio channel in order to cut possible transmission delays due to excessive transmission cycle.

When the number of time slots is low a further decreasing of the total number of time slots or the number of random time slots does not mean any substantial advantages as far as transmission delay and accessability is concerned. Furthermore, there may be a shortage of radio channels at other base stations. When the traffic load is reduced substantially at a base station using more than one radio channel for transmission of messages from mobiles, it is therefore normally preferred to close down one of the radio channels rather than reducing the number of time slots of each channel below a certain low number. Instead of reducing the number of slots, the base station then closes down one of its radio channels used by mobile stations for message transmission by transmitting on that radio channel a message ordering all mobiles or at least the mobiles previously authorized on this radio channel to retune to (one of the) remaining radio channel(s) of the base stations. The authorization to transmit on the remaining channel(s) is amended to take care of the retuned mobile stations. Normally the total number of time slots and/or the number of random slots on the remaining channel(s) is also immediately increased to cope with increased traffic due to increased number of authorized mobile stations.

Figure 6:
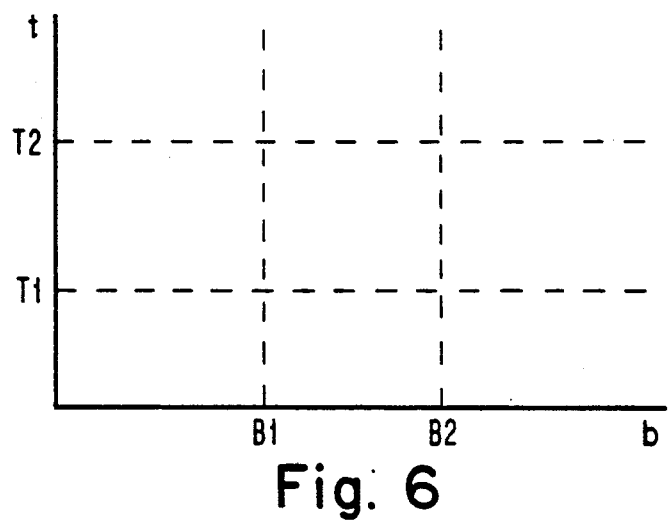

A third algorithm illustrated in FIG. 6 uses as first input, t, the average of a time code indicating the time from initiation of a message at mobile stations to time of transmission of message understandably received at base station. The average may be calculated solely on the latest transmission cycle or it may be calculated as a common value for the latest and at least one more cycle immediately preceeding the latest.

The third algorithm uses as a second input, b, the counted number of busy time slots divided by the total number of time slots in one or more succeeding transmission time cycles including the latest cycle.

The third algorithm also uses a first comparatively low time code threshold, T1, and a second comparatively high time code threshold, T2, choosen such that average waiting or access times corresponding to values of t less than T2 are generally accepted by system users and such that average waiting or access times corresponding to value of t less than T1 is generally not considered an advantage by system users.

The third algorithm also uses a first comparatively low threshold, B1, and a comparatively high threshold, B2, for the counted number of busy time slot divided by the total number of time slots.

According to the third algorithm, the number of time slots in the next transmission cycle on a channel used by a base station is increased by one or a new channel is opened up when $t>T2$ and simultaneously $b<B2$ for one of the channels used by the same base station. The same is due when $t<T2$ and simultaneously $b>B2$ for one of the channels used by the same base station. If $t>T2$ and simultaneously $b>B2$ on a channel used by a base station, the time slots of the next transmission cycle of a channel used by the same base station is increased by two or a new channel is opened up. The number of time slots of a used channel is increased only if lower than a first "maximum time slot" threshold N1. A new channel is opened up only if the number of time slots in the latest transmission cycle on each channel used by base station is greater than a second "increase number of used channels" threshold N2.

According to the third algorithm, the number of time slots in the next transmission cycle on a channel used by a base station is decreased by one or one of the plural channels used is closed down when $t<T1$ and simultaneously $b<B1$ for one of the channels used by the same base station. The number of time slots on a channel used is reduced only if greater than a third "minimum time slot number" threshold N3. A channel is closed down only when more than one channel is used by the base station and the number of time slots on each channel is less than a fourth "reduce number of used channels" threshold N4.

According to the third algorithm no change of time slots on a used channel is initiated by the mere fact that $t<T2$ and simultaneously $B1<b<B2$. Neither is any change of time slots on a used channel initiated by the mere fact that $b<B2$ and simultaneously $T1<t<T2$. However, for the purpose of appropriate load sharing between two or more channels used by same base station or for the purpose of similar or equal access or waiting time, the number of the time slots of one of the used channel may be reduced provided that at the same time the number of time slots of an other used channel is increased leaving the sum of time slots of all used channels unchanged.

When according to the third algorithm the number of time slots should be reduced or increased and there are more than one used channel the number of time slots of which may according to the algorithm be reduced or increased, respectively, then the decision on which channel should have a reduced or increased number of time slots, respectively, is based on requirements on load sharing or similar or equal access or waiting times.

In connection with this it will sometimes be appropriate to divert some kinds or groups of mobiles from one used channel to an other channel used by the same base station by transmitting from the base station messages ordering certain served mobile stations to retune to other channel and correspondingly change the authorization to transmit on the channels in the next transmission invitation messages on the channels.

When using transmission codes and the first or second algorithm, the general principles for determining whether to open up a new channel or closing down a used channel may be very similar to those described above in connection with the third algorithm. The same is due for selection of channel the time slots of which to be increased or decreased if, in wiev of present time slots and number of used channels, more than one channel is electable. Simultaneous reduction of time slots on one used channel and increase of time slots on an other channel used by the same base station while leaving the sum of time slots unchanged without or in connection with diverting mobiles from one channel to an other channel of same base station may also be implemented in connection with algorithm one or two.

The time slot length and the maximum mobile station message length allowed without prior access request may influence the traffic handling capacity if determined too short or too long in relation to the normal lengths of messages due for transmission from mobile stations. If the time slot length and maximum message length are too short, too large a percentage of the messages to be transmitted will be longer than that and accordingly will require prior access request and acknowledgement prior to transmission. Then too large a part of the traffic handling capacity of the channel will be consumed on access requests and acknowledgements and too small a part of the capacity will be available for correct transmission of the actual messages themselves.

If the time slot lengths and maximum message length are too long, there will be too many interferences between short and long messages transmitted at least partly simultaneously in the same time slots, whereby there will be too many repetition messages and too small a part of the traffic handling capacity of the channel will be available for correct transmission of messages understandably received at base station.

According to preferred embodiments of the present invention the length of time slot and/or maximum mobile station message are determined in view of average time codes and/or average transmission codes in combination with counted number or busy or successful or empty time slots in relation to corresponding total number of time slots. E.g. when there are small average transmission or time codes and few busy time slots the lengths of time slots and maximum mobile station message may be longer than when there are many busy time slots and high average time or transmission codes.

The transmission codes used in the first or second algorithm are numbers indicating the number of times a message has been transmitted or repeated.

The invention is not limited to the described algorithms but other algorithms are possible within the scope of invention. Neither is the invention restricted to using base or mobile stations according to FIGS. 7 and 8. A base station and a mobile station to be used in connection with a method according to the present invention may be very similar to prior art base and mobile stations, e.g. base or mobile stations according to the mentioned patents US4398289 or US4672608 or the MOBITEX system. Some amendments are of course required. Obviously the format of mobile station messages must include space for time and/or transmission codes. The mobile stations must comprise means for generating time and/or transmission codes and the mobile stations must comprise means for incorporating the codes in messages to be transmitted. The base stations must comprise means for storing rules and algorithms to be used, means for retrieving codes from received mobile station messages and means z for determining at least one parameter in view of the transmission or time codes of messages understandably received at base station from served mobile stations.

If the mobile station message format already comprises space for an other code not to be used, this space can be used provided it is large enough. If such an already existing space is too small or there is no such code space already existing the space has to be extended or a new appropriate space has to be created by extending the message format, respectively. For transmission codes the space should allow transmission of one of at least eight different numbers, e.g. the numbers 0 to 7. For time codes the space should allow transmission of one of a much larger numbers, e.g. the numbers 0 to 64. The larger the number the more accurate may a calculation of access time or transmission delay time be when based on the time codes.

The means for storing and determining codes, rules and algorithms may conveniently be microprocessors and data stores already existing for storing and determining other information and/or parameters in the base and mobile stations.

The means for incorporating the codes in mobile station messages may be the microprocessors or mobile station message generators already existing in the mobile stations for incorporating other information in mobile station messages but modified to also incorporate the codes.

The means in base station for retrieving codes from received understandable mobile station messages may be the means already existing in base station for retrieving other information from such received mobile station messages but modified to also retrieve the codes.

The message formats of the MOBITEX system are considered particularly well suited for being extended with an information field for time or transmission codes. The message formats are disclosed in the terminal specification for the MOBITEX system available from Televerket in Sweden. The information in this terminal specification is included herein as a reference. A base and mobile station for the MOBITEX system operating in accordance with the terminal specification available and presently purchasable from Ericsson only require amendment of the microprocessor software in order to implement the present invention. Accordingly, it is not necessary to describe here the hardware of a base or mobile station for implementing the present invention. Use of the present invention is however not restricted to base and mobile stations with hardware in accordance with the MOBITEX system but the invention may be implemented in system where the base and mobile stations have different hardware and operate differently than the base and mobile stations according to the MOBITEX system.

I claim:

1. A method adaptive communications in a radio communication system with base and plural mobile stations comprising the steps of:

transmitting from a base station a radio transmission invitation message comprising information regarding how many transmission time slots will follow the transmission invitation message and how many of those transmission time slots will be random time slots and information regarding time slot length, the radio transmission invitation message authorizing at least some of the mobile stations to transmit messages to the base station on a common radio channel;

selecting at any mobile station having a new message to be transmitted and after receiving an authorizing invitation message one of the transmission time slots according to the received transmission invitation message;

transmitting from any such authorized mobile station at least part of its new message in its selected transmission time slot on the common radio channel, the new message transmitted from the mobile station comprising a transmission code indicating how many times if any the new message has been previously transmitted by the mobile station;

transmitting from the base station an acknowledgement message to any mobile station after receiving a message from that mobile station in a transmission time slot on the common radio channel according to the invitation message from the base station, the acknowledgment message being transmitted prior to transmitting a new radio transmission invitation message concerning the common radio channel;

selecting, at any authorized mobile station of a group of mobile stations having transmitted a message to the base station son the common radio channel but not received an acknowledgement message from the base station prior to receiving a new transmission invitation message from the base station concerning the common radio channel, a new transmission time slot among the random time slots according to the new transmission invitation message;

transmitting from any of said group of mobile stations at least part of a repetition message in its new transmission time slot on the common radio channel, the repetition message transmitted comprising said transmission code; and adapting a communications procedure in view of the transmission codes of messages from mobile stations received by the base station.

2. A method according to claim 1 wherein the number of transmission time slots following the next transmissions invitation message to be transmitted by the base station is determined in view of the transmission codes of messages from mobile stations received by the base station.

3. A method according to claim 1 wherein the transmission time slot length of time slots following the next transmission invitation message to be transmitted by the base station is determined in view of the transmission codes of messages from mobile stations received by the base station.

4. A method according to claim 1 wherein a maximum mobile station message length is determined in view of the transmission codes of messages from mobile stations received by the base station.

5. A method according to claim 1 wherein additional radio channels for communication between the base and mobile stations are opened or closed by the base station in view of the transmission codes of messages from mobile stations received by the base station.

6. A method according to claim 1 comprising the further step transmitting with messages from mobile stations time codes enabling the receiving base station receiving a mobile station message comprising such time code to estimate message age.

7. A method according to claim 6 wherein the number of transmission time slots following the next transmission invitation message to be transmitted by the base station is determined in view of the time codes of messages from mobile stations received by the base station.

8. A method according to claim 6 wherein the transmission time slot length of time slots following the next transmission invitation message to be transmitted by the base station is determined in view of the time codes of messages from mobile stations received by the base station.

9. A method according to claim 6 wherein a maximum mobile station message length is determined in view of the time codes of messages from mobile stations received by the base station.

10. A method according to claim 6 wherein additional radio channels for communication between the base and mobile stations are opened or closed by the base station in view of time codes of messages from mobile stations received by the base station.

11. A method according to claim 1 comprising the further steps of:

receiving at the base station radio signals appearing on the common radio channel in the transmission time slots following its transmission invitation message;

estimating based on the received radio signals for each transmission time slot following the invitation message whether the time slot is empty because there is no mobile station attempting to transmit or the time slot is busy because at least one mobile station is attempting to transmit on the common radio channel at least part of a message in the transmission time slot of the invitation message; and counting the number of busy transmission time slots of the invitation message where according to the estimation at least one mobile station is attempting to transmit a message.

12. A method according to claim 11 wherein the number of transmission time slots following the next transmission invitation message to be transmitted by the base station is determined in view of the counted number and total number of transmission time slots of the invitation message.

13. A method according to claim 11 wherein the transmission time slot length of time slots following the next transmission invitation message to be transmitted by the base station is determined in view of the counted number and total number of transmission time slots of the invitation message.

14. A method according to claim 11 wherein a maximum mobile station message length is determined in view of the counted number and total number of transmission time slots of the invitation message.

15. A method according to claim 11 wherein additional radio channels for communication between the base stations are opened or closed by the base station in view of the counted number of transmission time slots of the invitation message.

16. A method of adaptive communications in a radio communication system including base and plural mobile stations comprising the steps of:

transmitting from a base station a radio transmission invitation message comprising information regarding how many transmission time slots will follow the transmission invitation message, how many of those transmission time slots will be random time slots and information regarding time slot length, the radio transmission invitation message authorizing at least some of the mobile stations to transmit messages to the base station on a common radio channel;

selecting at any mobile station having a new message to be transmitted and after receiving an authorizing transmission invitation message one of the transmission time slots according to the received transmission invitation message;

transmitting from any such authorized mobile station at least part of its new message in its selected transmissiion time slot on the common radio channel, the new message transmitted from the mobile station comprising a time code enabling the receiving base station receiving a mobile station message comprising such time code to estimate message age;

transmitting from the base station an acknowledgement message to any mobile station after receiving a message from that mobile station in a transmission time slot on the common radio channel, according to the invitation message from the base station, the acknowledgement message being transmitted prior to transmitting a new radio transmission invitation message concerning the common radio channel;

selecting at any authorized mobile station of a group of mobile stations, having transmitted a message to the base station on the common radio channel but not receiving an acknowledgement message from the base station prior to receiving a new transmission invitation message from the base station concerning the common radio channel, a new transmission time slot among the random time slots according to the new transmission invitation message;

transmitting from any of said group of mobile stations at least part of a repetition message in its new transmission time slot on the common radio channel, the repetition message transmitted comprising said time code; and adapting a communications procedure in view of the time codes of messages from mobile stations received by the base station.

17. A method according to claim 16 wherein the number of transmission time slots following the text transmission invitation message to be transmitted by the base station is determined in view of the time codes of messages from mobile stations received by the base station.

18. A method according to claim 16 wherein the transmission time slot length of time slots following the next transmission invitation message to be transmitted by the base station is determined in view of the time codes of messages from mobile stations received by the base statiion.

19. A method according to claim 16 wherein maximum mobile station message length for the transmission time slots following the next transmission invitation message to be transmitted by the base station is determined in view of the time codes of messages from mobile stations received by the base station.

20. A method according to claim 16 wherein additional radio channels for communication between the base and mobile stations are opened or closed by the base station in view of the time codes of messages from mobile stations received by the base station.

21. A method according to claim 16 comprising the further steps of:
receiving at the base station radio signals appearing on the common radio channel in the transmission time slots of its transmission invitation message;
estimating based on the received radio signals for each random time slot of the invitation message whether the particular time slot should be deemed empty because there is no mobile station transmitting or the particular time slot should be deemed busy because there is at least one mobile station attempting to transmit on the common radio channel at least part of a message in the transmission time slot of the invitation message; and
counting the number of busy random transmission time slots of the invitation message where according to the estimation at least one mobile station is attempting to transmit a message.

22. A method according to claim 21 wherein the number of transmission time slots following the next invitation message to be transmitted by the base station is determined in view of the counted number and total number of transmission time slots of the invitation message.

23. A method according to claim 21 wherein the transmission time slot length of time slots following the next transmission invitation message to be transmitted by the base station is determined in view of the counted number and total number of transmission time slots of the invitation message.

24. A method according to claim 21 wherein a maximum mobile station message length is determined in view of the counted number and total number of transmission time slots of the invitation message.

25. A method according to claim 21 wherein additional radio channels for communication between the base and mobile stations are opened or closed by the base station in view of the counted number and the total number of transmission time slots of the invitation message.

26. A method according to claim 21 comprising the further steps of:
transmitting with messages from mobile stations transmission codes indicating how many times if any the message has been previously transmitted by the mobile station.

27. A method according to claim 1 comprising the further steps of:
receiving at the base station radio signals appearing on the common radio channel in the transmission time slots of its transmission invitation message;
estimating based on the received radio signals for each random time slot of the invitation message whether the particular time slot should be deemed empty because there is no mobile station transmitting, or the particular time slot should be deemed busy because there is at least one mobile station attempting to transmit on the common radio channel at least part of a message in the transmission time slot of the invitation message; and
counting the number of busy random transmission time slots of the invitation message where according to the estimation at least one mobile station is attempting to transmit a message.

28. A method according to claim 1 comprising the further steps of:
receiving at the base station radio signals appearing on the common radio channel in the transmission time slots of its transmission invitation message;
estimating based on the received radio signals for each random time slot of the invitation message whether the particular time slot should be deemed empty because there is no understandable message received from a mobile station transmitting or the particular time slot should be deemed correct because there is an understandable message received from at least one mobile station attempting to transmit on the common radio channel at least part of a message in the transmission time slot of the invitation message; and
counting the number of correct random transmission time slots of the invitation message where according to the estimation at least one mobile station is attempting to transmit a message.

* * * * *